US010690164B2

(12) United States Patent
Stapleton (10) Patent No.: US 10,690,164 B2
(45) Date of Patent: Jun. 23, 2020

(54) FASTENERS, SYSTEMS, AND METHODS FOR WOOD CONSTRUCTION

(71) Applicant: Door County Rustic, LLC, Egg Harbor, WI (US)

(72) Inventor: Michael E. Stapleton, Egg Harbor, WI (US)

(73) Assignee: Door County Rustic, LLC, Egg Harbor, WI (US)

( * ) Notice: Subject to any disclaimer, the term of this patent is extended or adjusted under 35 U.S.C. 154(b) by 0 days.

(21) Appl. No.: 16/569,232

(22) Filed: Sep. 12, 2019

(65) Prior Publication Data

US 2020/0088227 A1    Mar. 19, 2020

Related U.S. Application Data

(60) Provisional application No. 62/731,579, filed on Sep. 14, 2018.

(51) Int. Cl.
*F16B 12/12* (2006.01)
*F16B 12/16* (2006.01)
(Continued)

(52) U.S. Cl.
CPC ............ *F16B 12/125* (2013.01); *F16B 12/16* (2013.01); *F16B 12/46* (2013.01); *F16B 2012/145* (2013.01); *F16B 2012/466* (2013.01)

(58) Field of Classification Search
CPC ........ F16B 12/10; F16B 12/12; F16B 12/125; F16B 12/14; F16B 12/16; F16B 12/18;
(Continued)

(56) References Cited

U.S. PATENT DOCUMENTS 2,082,300 A    6/1937  Orenstein
2,922,455 A    1/1960  Braendel
(Continued)

FOREIGN PATENT DOCUMENTS

DE    102016103774 A1 *  9/2017  ............... E04B 1/61

OTHER PUBLICATIONS

"Beadlock® Pro 3/8" Joinery Kit, Rockler Woodworking and Hardware website, retrieved from a. https://www.rockler.com/beadlock-pro-joinery-kit on Sep. 9, 2019.
(Continued)

*Primary Examiner* — Jonathan P Masinick
(74) *Attorney, Agent, or Firm* — Andrus Intellectual Property Law, LLP (57) ABSTRACT

A system for fastening a first wooden member to a second wooden member includes a tenon configured to couple to the first wooden member such that the tenon extends from the first wooden member. The tenon has a first hole, a second hole, and a third hole. A first fastener extends through the first hole of the tenon and secures the tenon to the first wooden member. A second fastener extends through the second hole of the tenon and secures the tenon to the first wooden member. A third fastener extends through the second wooden member and is received into the third hole of the tenon to thereby secure the first wooden member to the second wooden member. The third fastener can be removed to thereby disconnect the first wooden member from the second wooden member repeatedly without aesthetic damage or loss of structural integrity.

17 Claims, 12 Drawing Sheets

(51) Int. Cl.
  *F16B 12/14* (2006.01)
  *F16B 12/46* (2006.01)
(58) Field of Classification Search
  CPC ....... F16B 2012/466; A47B 2230/0074; A47B 2230/0081; Y10S 403/12; Y10S 403/13
  See application file for complete search history.

(56) References Cited

U.S. PATENT DOCUMENTS

| | | | |
|---|---|---|---|
| 3,236,342 | A | 2/1966 | Persson |
| 3,940,212 | A | 2/1976 | Gutner |
| 4,270,872 | A | 6/1981 | Kiyosawa |
| 4,290,710 | A | 9/1981 | Waller |
| 4,403,886 | A | 9/1983 | Haeusler |
| 4,905,680 | A | 3/1990 | Tunc |
| 5,108,399 | A | 4/1992 | Eitenmuller et al. |
| 5,407,307 | A | 4/1995 | Park |
| 5,492,160 | A | 2/1996 | McCracken |
| 5,785,712 | A | 7/1998 | Runciman et al. |
| D428,799 | S | 8/2000 | Stearns et al. |
| 6,502,492 | B1 | 1/2003 | Krohmer et al. |
| D493,355 | S | 7/2004 | Dinh |
| 6,942,418 | B2 * | 9/2005 | Knauseder ............ F16B 12/14 403/231 |
| D623,751 | S | 9/2010 | Weiman |
| D640,516 | S | 6/2011 | Krohmer et al. |
| 8,641,315 | B2 | 2/2014 | Liu et al. |
| 8,807,549 | B2 | 8/2014 | Henze et al. |
| 9,482,115 | B2 | 11/2016 | Harris et al. |
| D798,691 | S | 10/2017 | Webb |
| 9,924,984 | B2 | 3/2018 | Hartdegen et al. |
| D820,696 | S | 6/2018 | Metz |
| D856,786 | S | 8/2019 | Stapleton |
| 2003/0070381 | A1 | 4/2003 | Hawang |
| 2006/0177259 | A1 | 8/2006 | Yang |
| 2007/0222130 | A1 | 9/2007 | Leinbach et al. |
| 2009/0151616 | A1 | 6/2009 | Han |
| 2009/0281543 | A1 | 11/2009 | Orbay et al. |
| 2010/0254757 | A1 | 10/2010 | Saul |
| 2010/0329779 | A1 | 12/2010 | Chen |
| 2011/0085853 | A1 | 4/2011 | Liu |
| 2011/0255915 | A1 | 10/2011 | Chen et al. |
| 2012/0107042 | A1 | 5/2012 | Schneider |
| 2012/0292271 | A1 | 11/2012 | Bevelacqua |
| 2013/0022394 | A1 | 1/2013 | Yang |
| 2013/0058707 | A1 | 3/2013 | Wang |
| 2013/0239509 | A1 | 9/2013 | Wang |
| 2014/0079509 | A1 | 3/2014 | Chalverat |
| 2014/0294498 | A1 * | 10/2014 | Logan .............. A47B 47/042 403/376 |
| 2016/0025125 | A1 | 1/2016 | Bonney |
| 2017/0321734 | A1 | 11/2017 | Maertens et al. |
| 2018/0031019 | A1 | 2/2018 | Sjostedt et al. |
| 2018/0135677 | A1 | 5/2018 | Cattaneo |
| 2019/0211860 | A1 * | 7/2019 | Yang ................ F16B 12/125 |

OTHER PUBLICATIONS

"Striplox", Striplox website, retrieved from http://www.joinlox.com/product/striplox/ on Sep. 9, 2019.
"Kreg Jig® K4", Kreg website, retrieved from https://www.kregtool.com/store/c13/kreg-jigsreg/p34/kreg-jigreg-k4/ on Sep. 9, 2019.
"Dowl-It", Dowl-It website, retrieved from https://www.dowl-it.com/ on Sep. 9, 2019.
"Festool 574447 DF 700 XL EQ Plus Domino Joiner Set", FestoolProducts.com website, retrieved from https://www.festoolproducts.com/festool-574447-df-700-xl-eq-plus-domino-joiner-set.html?SID=ol59q36noo3fuigp7aqad5v3c4 on Sep. 9, 2019.
"P3006 thru P3013—Channel Nuts w/o Spring (1-5/8" Series)", Unistrut website, retrieved from https://www.unistrut.us/product-details/p3006-thru-p3013 on Sep. 9, 2019.
"Bed Rail Connection System Installation", Rockier Woodworking and Hardware website, retrieved from http://go.rockler.com/tech/37928-Bed-Rail-Inst.pdf on Sep. 9, 2019.
"Bed Rail Connection System", Rockler Woodworking and Hardware website, retrieved from https://www.rockler.com/bed-rail-connection-system on Sep. 9, 2019.
"Beadlock® Tenon Stock", Rockier Woodworking and Hardware website, retrieved from https://www.rockler.com/beadlockreg-tenon-stock on Sep. 9, 2019.
"Dowelmax Classic 3/8 Joining System 2019", Dowelmax website, retrieved from https://www.dowelmax.com/product/classic-3-8-dowel-jig-system/ on Sep. 9, 2019.

* cited by examiner

FASTENERS, SYSTEMS, AND METHODS FOR WOOD CONSTRUCTION

CROSS-REFERENCE TO RELATED APPLICATION

The present disclosure is based on and claims priority to U.S. Provisional Patent Application No. 62/731,579 filed Sep. 14, 2018, the disclosure of which is incorporated herein by reference.

FIELD

The present disclosure relates to wood construction and more specifically to fasteners, systems, and methods for joining wooden members.

BACKGROUND

Mortise and tenon is a part of human wood-framed construction history and has been used to construct many different objects such as furniture, buildings, or other house appliances. However, existing methods of mortise and tenon joinery are far from perfect and create several issues when the user is applying mortise and tenon to various situations. First, traditional wood-to-wood mortise and tenon joinery requires a skilled craftsperson or expert in the trade to cut the rectangular tenons and bore the matching, deep, rectangular mortises. Second, the traditional method of wood-to-wood mortise and tenon requires glue to ensure the mortise and tenon remain attached to each other. Using glue adds the elements of application time, glue costs, drying time and glue cleanup. Third, clamps or other tools are required to bring and then hold the mortise and tenon together until the glue is dried. Moreover, clamps only work for short perpendicular or parallel connections and not for connections where the plurality of objects or members is long or at angles other than perpendicular or parallel. Fourth, metal-to-metal connections require welding skills and a welding machine and/or metalworking equipment. Fifth, metal-to-wood connections require both metalworking and woodworking skills, tools, and machinery. Sixth, connections made of wood-to-wood are not as weather-resistant as metal-to-metal, metal-to-wood or synthetics and will shrink and leave a gap between the object's joints and may lead to further deterioration from weather or insects. Seventh, where the first object is in horizontal position and the second object is in a vertical position, with through-tenons joined at 90.0 degrees where the horizontal object must be offset, higher or lower, on the vertical object, to prevent the through-tenons from colliding inside the vertical object. Eighth, if the plurality objects are connected with glue or welded to each other, the plurality of joined objects cannot later be separated and then reconnected multiple times without severe damage. Ninth, if conventional wood screws are used to connect the first object and the second object, and then attempts are made to remove and then reinsert those screws, for purposes of disconnecting the first object and the second object, the hole created by the screw is enlarged with each attempt resulting in a connection that will fail.

Other variations of mortise and tenon joinery include dowel or biscuit mortise and tenon methods. However, these methods also create issues. For example, boring a mortise on the butt end of the first object to receive a dowel or biscuit is difficult due to the small surrounding surface area. Also, the dowels, biscuits, and the tools or jigs to create the mortises are sized to work with furniture-sized second object thus not available for larger-scale objects such as those used for timber-frame or post and beam construction. Furthermore, timber-frame and post and beam construction methods also have issues. For example, timber-frame and post and beam are very heavy, highly skilled carpenters and expensive tools are required to create the large tenons, to bore the deep mortises and difficult to test-fit without long, heavy, expensive clamps.

Accordingly, the present inventor has endeavored to develop fasteners, systems, and methods for wood construction that eliminate or minimize issues of conventional wood constructions methods, and through research and development, the present inventor has developed the fasteners, systems, and methods described hereinbelow.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a method for fastening a first wooden member to a second wooden member includes the step of securing, with a first fastener and a second fastener, a tenon to the first wooden member such that the tenon extends away from the first wooden member. The tenon has a first hole in which the first fastener is received, a second hole in which a second fastener is received, and a third hole. The method further includes the steps of positioning the tenon into a cavity defined in a first side of the second wooden member such that the first wooden member is adjacent to the first side of the second wooden member, positioning a third fastener through the second wooden member such that the third fastener extends into the cavity, and receiving the third fastener in the third hole of the tenon to thereby fasten the first wooden member to the second wooden member.

In certain examples, a method for fastening a first wooden member to a second wooden member includes the step of securing, with a first fastener and a second fastener, a tenon to the second wooden member such that the tenon extends away from the second wooden member. The tenon has a first hole in which the first fastener is received, a second hole in which a second fastener is received, and a third hole. The method further includes the steps of positioning the tenon into a cavity defined in a first side of the first wooden member such that the first wooden member is adjacent to the first side of the second wooden member, positioning a third fastener through the first wooden member such that the third fastener extends through a cavity in the first member into the third hole of the tenon to thereby fasten the first wooden member to the second wooden member.

In certain examples, a system for fastening a first wooden member to a second wooden member that extends along a longitudinal axis and has a first side and a second side opposite the first side includes a tenon configured to couple to the first wooden member such that the tenon extends from the first wooden member. The tenon has a first hole, a second hole, and a third hole. A first fastener extends through the first hole of the tenon and is configured to secure the tenon to the first wooden member. A second fastener extends through the second hole of the tenon and is configured to secure the tenon to the first wooden member. A third fastener extends through the second wooden member and is received into the third hole of the tenon to thereby secure the first wooden member to the second wooden member.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

FIG. 18 is a perspective view of a table constructed with systems of the present disclosure. The members that are connected to form the table are depicted as transparent.

DETAILED DISCLOSURE

Figure 1:
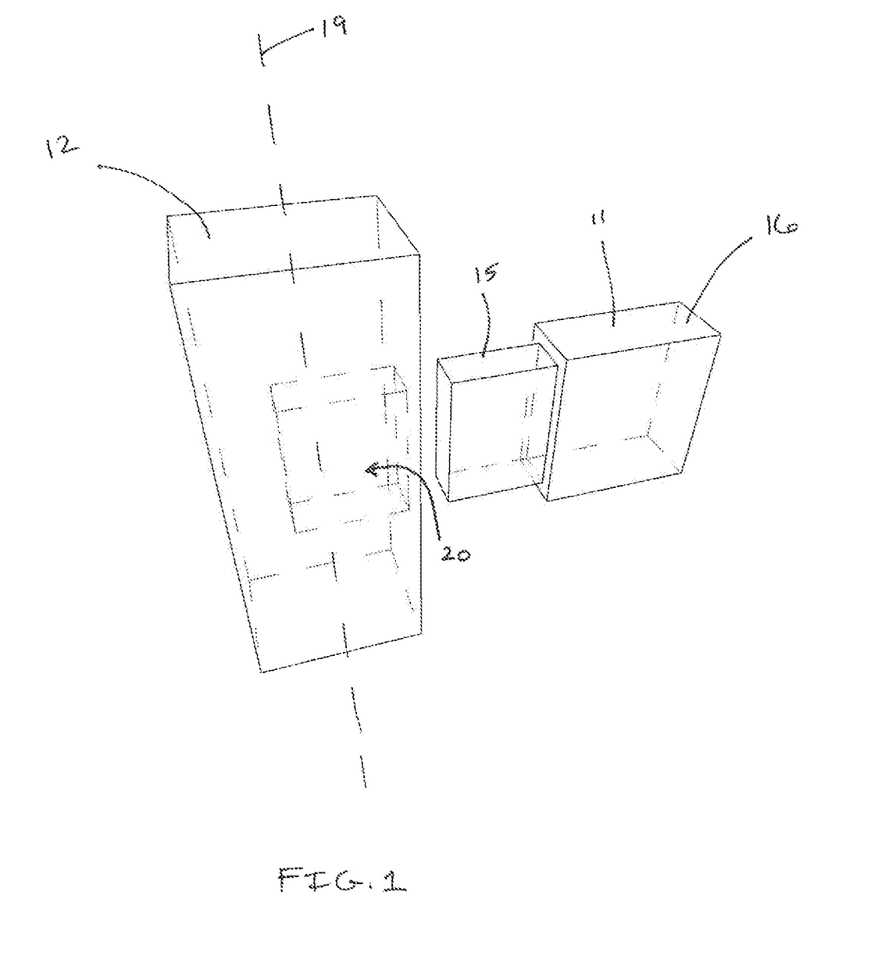
FIG. 1 is perspective view of an example conventional mortise and tenon joinery between two members. The first and second members are depicted disconnected and transparent.

FIG. 1 depicts an example conventional mortise and tenon joinery between two members, namely a first member 11 and a second member 12. The members 11, 12 can be formed of any suitable material such as wood, metal, and plastic. Note that the members 11, 12 in FIGS. 1-4 are depicted as transparent. The first member 11 has a tenon end 15 that is generally rectangular and an opposing end 16 that is also generally rectangular. The dimensions of the tenon end 15 are smaller than the dimensions of the opposing end 16. The second member 12 extends along a longitudinal axis 19 and has a cavity 20 defined therein that corresponds to the shape of the tenon end 15. To connect the members 11, 12, the tenon end 15 is inserted into the cavity 20. The tenon end 15 is retained in the cavity 20 with glue or friction.

Figure 2:
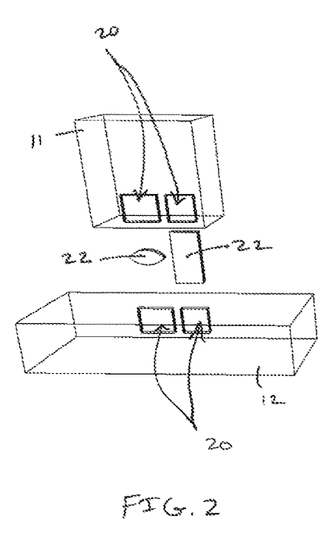
FIGS. 2-4 are perspective views of conventional joinery methods using dowel or biscuit mortise and tenon methods. The first and second members are depicted disconnected from each other and transparent.
Figure 3:
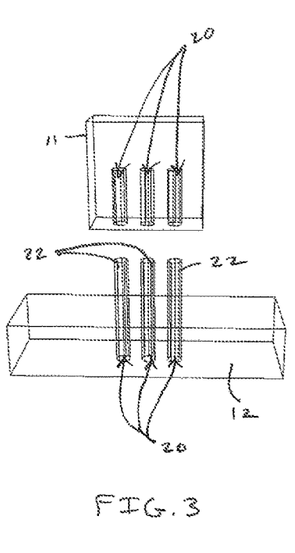
Figure 4:
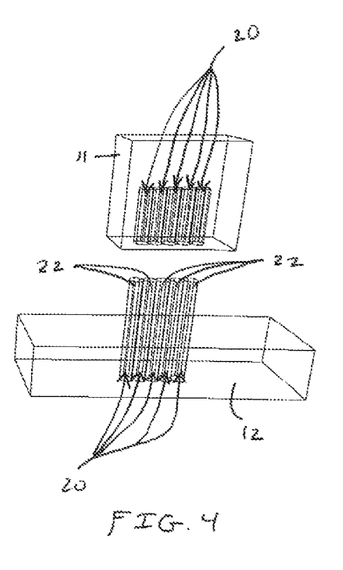

FIGS. 2-4 depict examples of conventional dowel or biscuit mortise and tenon methods. In these examples, one or more cavities 20 are defined in each member 11, 12 and one or more arms 22 (e.g., biscuits, rods) are partially received in the cavities 20 of the first and second members 11, 12. That is, part of an arm 22 is received in a cavity 20 of the first member 11 and another part of the arm 22 is received in a cavity 20 of the second member 12 that corresponds to the cavity 20 of the first member 11. FIGS. 3-4 depict the arms 22 received in the cavities 20 of the second member 12 and extending therefrom and the first member 11 to the second member 12 disconnected from each other. In the conventional examples depicted, there is no friction or other resource to hold the first member 11 to the second member 12. Thus, in all the examples depicted in FIG. 2-4, the cavities 20 must receive glue or adhesive otherwise the members 11, 12 will fall away from each other. Furthermore, the members 11, 12 depicted in FIGS. 2-4 must be pushed together by strong force, typically one or more clamps, until there is no gap between the members 11, 12 and then the members 11, 12 must remain in a clamped position until the adhesives are dry. Furthermore, once the adhesives are dry the members 11, 12 can never again be separated, as is the desired outcome for beds, bunks, tables, and other structures where dry assembly and then disassembly for transportation or where large furniture and/or structures will not fit through openings or in shipping containers, without aesthetic and structural damage.

Figure 5:
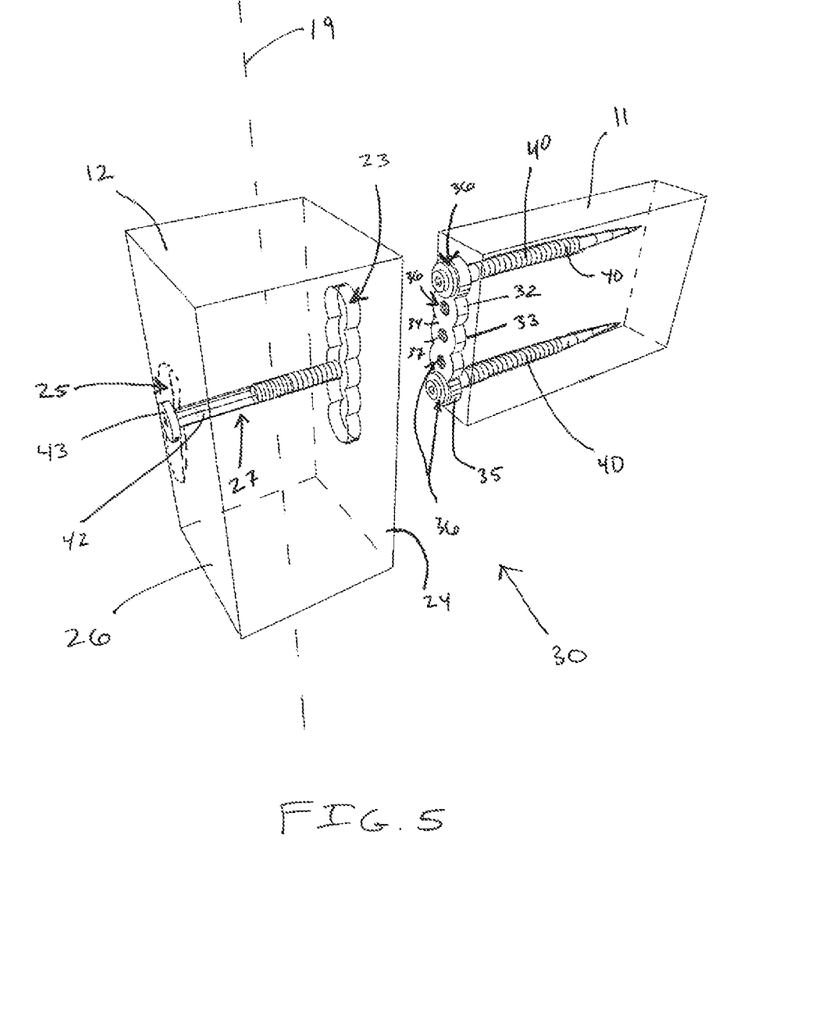
FIG. 5 is a perspective view of an example system of the present disclosure for connecting the first member to the second member. The first and second members are depicted disconnected from each other and transparent.
Figure 6:
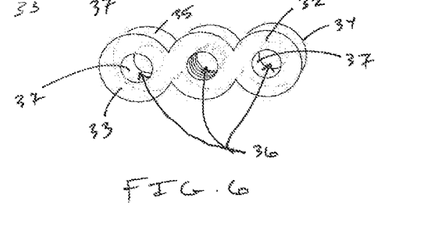
FIGS. 6-9 are perspective views of example tenons.

Referring now to FIG. 5, an example connection system 30 of the present disclosure for connecting the first member 11 to the second member 12 is depicted. Note that in FIG. 5 the members 11, 12 are depicted as transparent and disconnected from each other. The system 30 includes a tenon 32 (described hereinbelow) in which one or more holes and a plurality of fasteners 40, 42 that securely fasten the tenon 32 to the first member 11 and the members 11, 12 together. Connecting the members 11, 12 with the system 30 is described in greater detail below.

To begin connecting the members 11, 12 with the system 30, the tenon 32 is positioned on the first member 11. That is, the user places a first surface 33 of the tenon 32 against the first member 11. Two or more fasteners 40 are then inserted through holes 36 in the tenon 32 and driven into the first member 11 to a maximum depth allowed by the fastener 40. Accordingly, the tenon 32 is permanently secured to the first member 11 by the fasteners 40.

The user then prepares the second member 12 for connection to the first member 11 and the tenon 32. The user begins by drilling a cavity 23 in a first side 24 of the second member 12, an opening 25 in a second side 26 of the second member 12, and a bore 27 through the second member 12 that extends to and through the cavity 23 and the opening 25. Note that the shape of the cavity 23 can vary, and in certain examples, the cavity 23 is shaped to correspond with the shape of the tenon 32. Also, the shape of the opening 25 can vary. In one example, the shape of the opening 25 corresponds with the shape of the head 43 of the fastener 42 such that the head 43 of the fastener 42 is recessed into the opening 25 when the fastener 42 is received in the bore 27 (described hereinbelow). In another examples, the opening 25 is enlarged relative to the head 43 of the fastener 42 such that a tool (not shown), such as a socket wrench can engage the fastener 42. In other examples, the opening 25 can be eliminated entirely whereby an intermediary member, such as a washer (not shown), can be placed between the head 43 of the fastener 42 and the surface of the second side 26.

Once the second member 12 is prepared, the tenon 32 on the first member 11 is inserted into the cavity 23. Then a fastener 42 is inserted into the opening 25 and the bore 27 such that the threaded end of fastener 42 engages with one of the threaded holes 36 of the tenon 32. Note that the fastener 42 extends through the bore 27 of the second member 12 is received into a threaded hole 36 of the tenon 32 that is threaded and not occupied by the fasteners 40 that connect the tenon 32 to the first member 11. The fastener 42 has a threaded end that engages with threads in the hole 36, and accordingly, rotation of the fastener 42 causes the fastener 42 to engage with the tenon 32 and cause the tenon 32 and the first member 11 to be pulled into tight contact, without other mechanical means such as clamps, with the second member 12. In certain examples, the first side 24 of the second member 12 contacts the first member 11 as the fastener 42 is tightened. The system 30 does not require clamps to draw members 11, 12 together as tightening occurs and does not require adhesives, screws, or other mechanical means to hold the members 11, 12 together. Furthermore, this process of attaching the members 11, 12 together can be reversed thus detaching the first member 11 from the second member 12 and then repeated to again attach the members 11, 12 and then repeated an unlimited number of times without aesthetic or weakening of structural integrity of the connection. In certain examples, the second member 12 does not have the opening 25. Instead, in this example, the fastener 42 is driven into and through the bore 27 of the second member 12. In another example, multiple threaded fasteners 42 extend through the second member 12 and engage the threaded holes 36 of the tenon 32. In another example, the bore 27 is excluded and the fastener 42 is driven through the second member 12.

Figure 7:
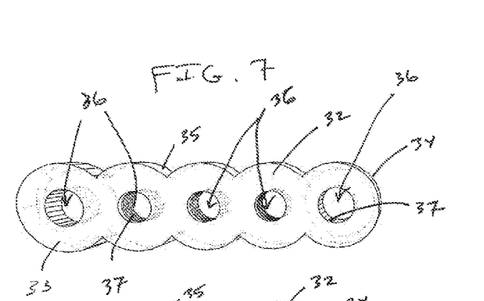
Figure 8:
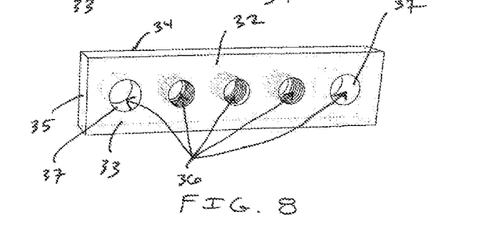
Figure 9:
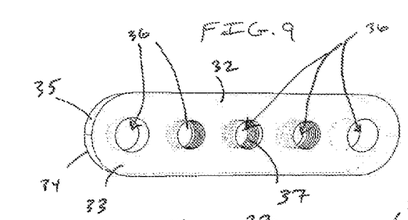

Referring to FIGS. 6-9, example tenons 32 are depicted. Note that the tenons 32 include one or more holes 36, some of which are threaded to accept matching threaded fasteners 42, such as machine bolts. The threaded hole(s) 36 permit the members 11, 12 to be draw together and held together and then allowing for the members 11, 12 to be detached and reattach to each other an unlimited number of times. The tenon 32 has a first surface 33, a second surface 34, and a perimeter or surrounding surface 35. A plurality of holes 36 extends through the tenon 32 and the first and second surfaces 33, 34. Each hole 36 is defined by an interior surface 37. In certain examples, threads extend from the interior surface 37 into the hole 36 to thereby engage fasteners 40, 42 (FIG. 5) received in the hole 36. For instance, the three centermost holes 36 depicted in FIGS. 7-9 are threaded. The shape of the tenon 32 can vary, and the shape of the tenon 32 may be advantageously shaped to correspond with and simplify formation (e.g., boring), including the formation of a boring consisting of holes formed by a common tool referred to as a drill press of the cavity 23. Furthermore, the tenon 32 is sized and shaped to assist with alignment during assembly and to prevent bending, twisting, or pulling away of the members 11, 12 when the connection between the members 11, 12 is complete.

The tenon 32 can be formed with metal or other synthetic materials. The threads that extend into the holes 36 may accept fasteners 42 made of any suitable material. In certain examples, the connection between the tenon 32 and the fastener 42 becomes one of metal-to-metal, or synthetics, the repeated turning and unturning of the fastener 42 permits the member 11, 12 to be connected, disconnected, and reconnected an unlimited number of times. Furthermore, the tenon 32 is thinner than the depth of traditionally carved wooden tenons such that the user only needs to create a shallow cavity 23 in second member 12 of a size and shape of the tenon 32 in comparison with the much deeper mortise required in traditional mortise and tenon joinery. Furthermore, the metal-to-metal, or synthetics, allows the user to turn the fastener 42 with tools, such as a standard wrench or Allen wrench, perpendicular to the direction of the fastener 42 thus providing leverage to draw members 11, 12 tight together without assistance from other mechanical devices such as clamps.

In certain examples, the tenon 32 has a round-end shape that allows the user to bore the cavity 23 with a common drill bit in lieu of expensive, bulky, and heavy specialized and powered mortising machinery. Furthermore, the shape of the tenon 32 may permit the user to use a shallow-depth router bit and router to bore a capsule-shaped cavity 23 in a single, shallow pass.

Figure 10:
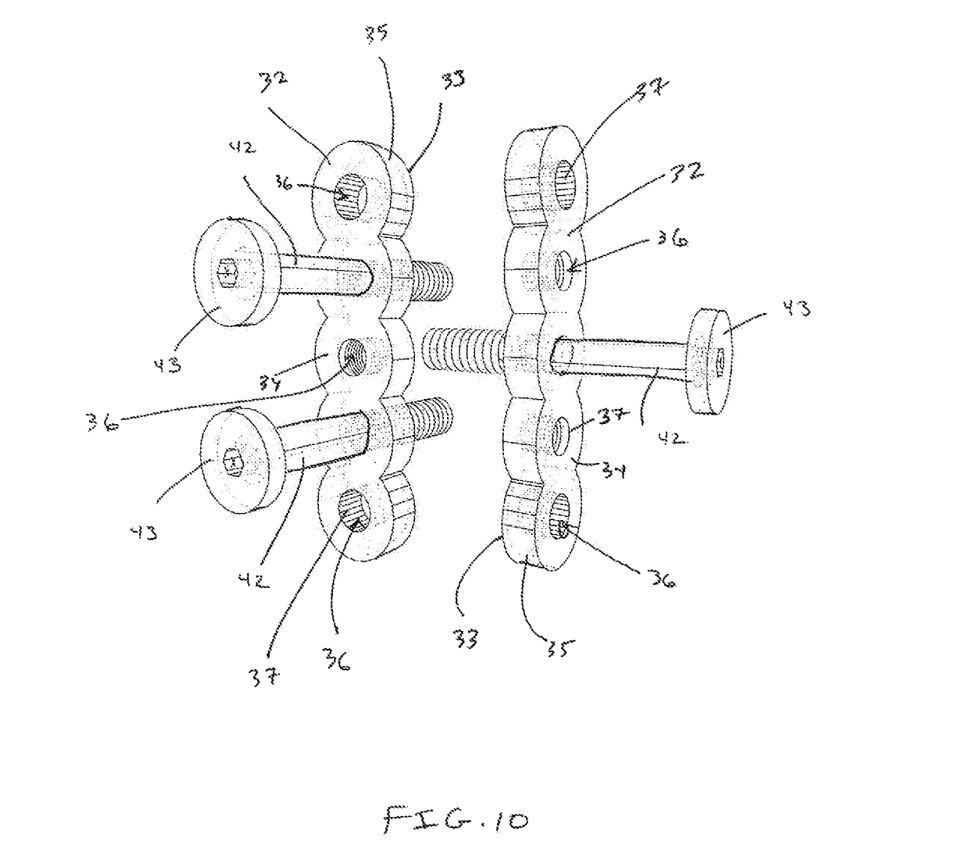
FIG. 10 is a perspective view of two example tenons with fasteners intersecting but without colliding due to offsetting holes of the tenons.

FIG. 10 depicts two example tenons 32 with fasteners 42 received in holes 36 of each tenon 32. The fasteners 42 in this example are bolts with threaded ends that engage with the threads on the interior surfaces 37 of the tenon 32. The fasteners 42 depicted in this example extend through the bore 27 in the second member 12 (not shown) to thereby engage the tenon 32. Note the threads of fasteners 42 are depicted turned into or engaging the corresponding threaded holes 36 of the tenon 32.

Figure 11:
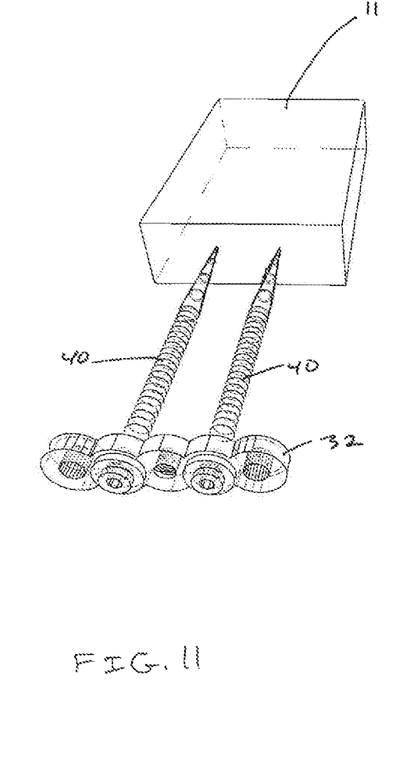
FIGS. 11-12 are perspective views of two example tenons with fasteners received in alternating holes of the tenons to avoid collision when passing each other inside a member.
Figure 12:
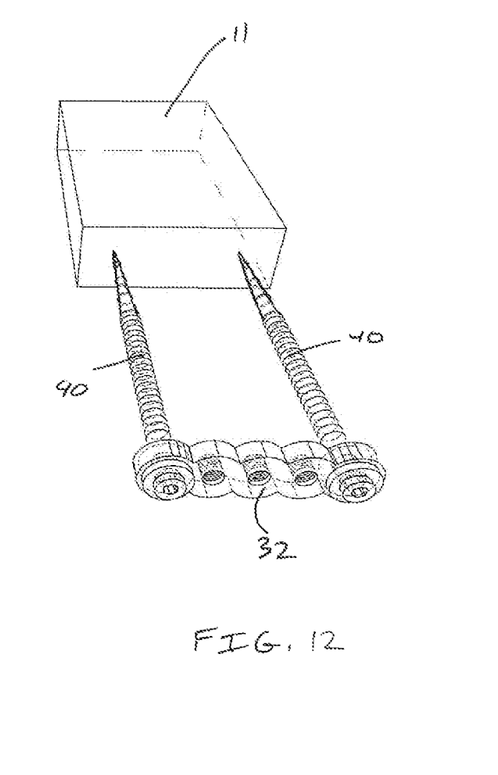

FIGS. 11-12 depicts two example tenons 32 with fasteners 40 received in holes 36 of the tenons 32. The fasteners 40 in this example are self-tapping screws that are driven into the first member 11. Note that the tenons 32 and the fasteners 40 are depicted disconnected from the first member 11. In certain examples, typically to avoid collision with fasteners 40, 42 coming perpendicular through member 12, the fasteners 40 that secure the tenon 32 to the first member 11 engage threads on the interior surfaces 37 of the tenon 32.

Figure 13:
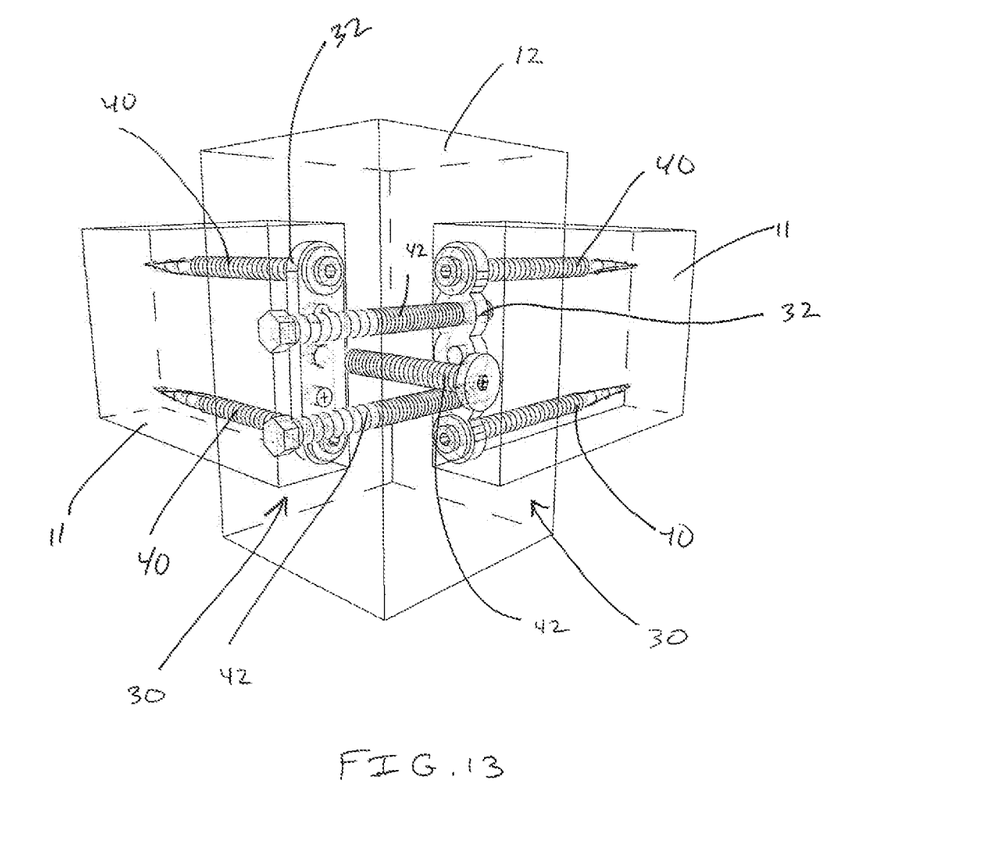
FIG. 13 is a perspective view of members connected together by two systems of the present disclosure whereby the fasteners passing through the member do not collide.

Referring to FIG. 13, two example systems 30 are depicted connecting two horizontal first members 11 to a single vertical second member 12. The members 11, 12 are depicted as transparent to thereby expose the systems 30. As is depicted, the fasteners 42 can be received into different holes 36 (FIG. 10) such that the fastener 42 do not conflict or intersect with each other. That is, using tenons 32 with multiple holes 36 having threads permits the user to avoid collision of the fasteners 42 as the fasteners 42 extend through the second member 12. The tenons 32 have several holes 36 in which the fasteners 42 can be received and tenons 32 with more holes 36 provide greater flexibility of the system 30.

Figure 14:
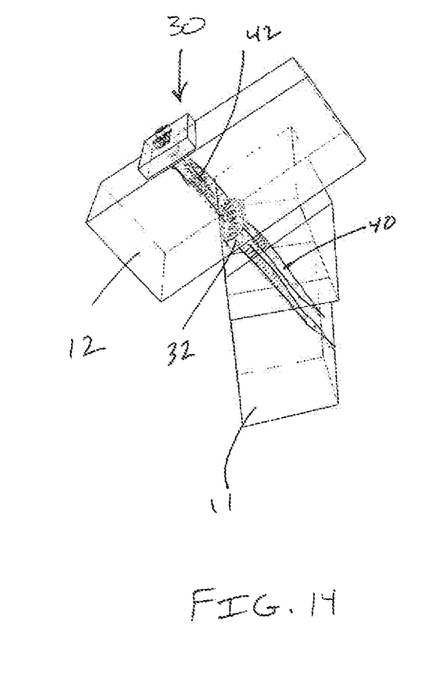
FIGS. 14-15 are perspective views of members connected at angles other than parallel or perpendicular by example systems of the present disclosure.
Figure 15:
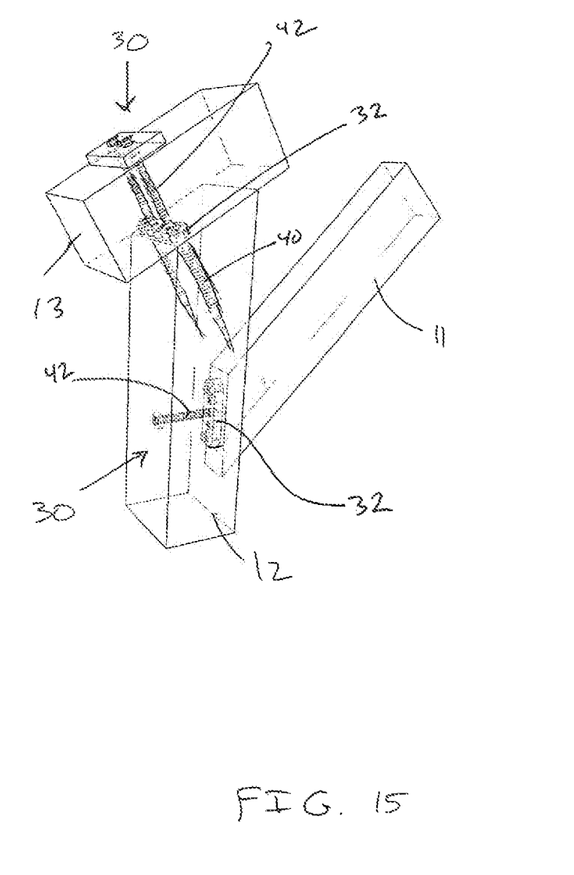

FIGS. 14-15 depict example systems 30 connecting different members 11, 12, 13. In FIG. 14, a first system 30 connects a first member 11 to a second member 12 such that the members 11, 12 are connected and extend relative to each other in a non-perpendicular orientation. In this example, when the members 11, 12 are joined using the system 30 at an angle other than perpendicular, the surfaces of those members 11, 12 remain parallel to each other, regardless of the angle of the members 11, 12. This situation allows the tenon 32 mounted on the first member 11 to enter the cavity 23 (FIG. 5) in the second member 12 at a 90-degree angle regardless of the angle at which the first member 11 extends relative to the second member 12. In comparison to conventional joinery methods, the system 30 is a major improvement over these conventional joinery methods as there is no need to drill angled, deep, rectangular mortises for receiving traditional tenon ends nor to cut a tenon on the end of a wood member that is not perpendicular or parallel to the surfaces of the member. FIG. 15 depicts a first system 30 connecting the first member 11 to the second member 12 and a second system 30' connecting the second member 12 to a third member 13.

Figure 16:
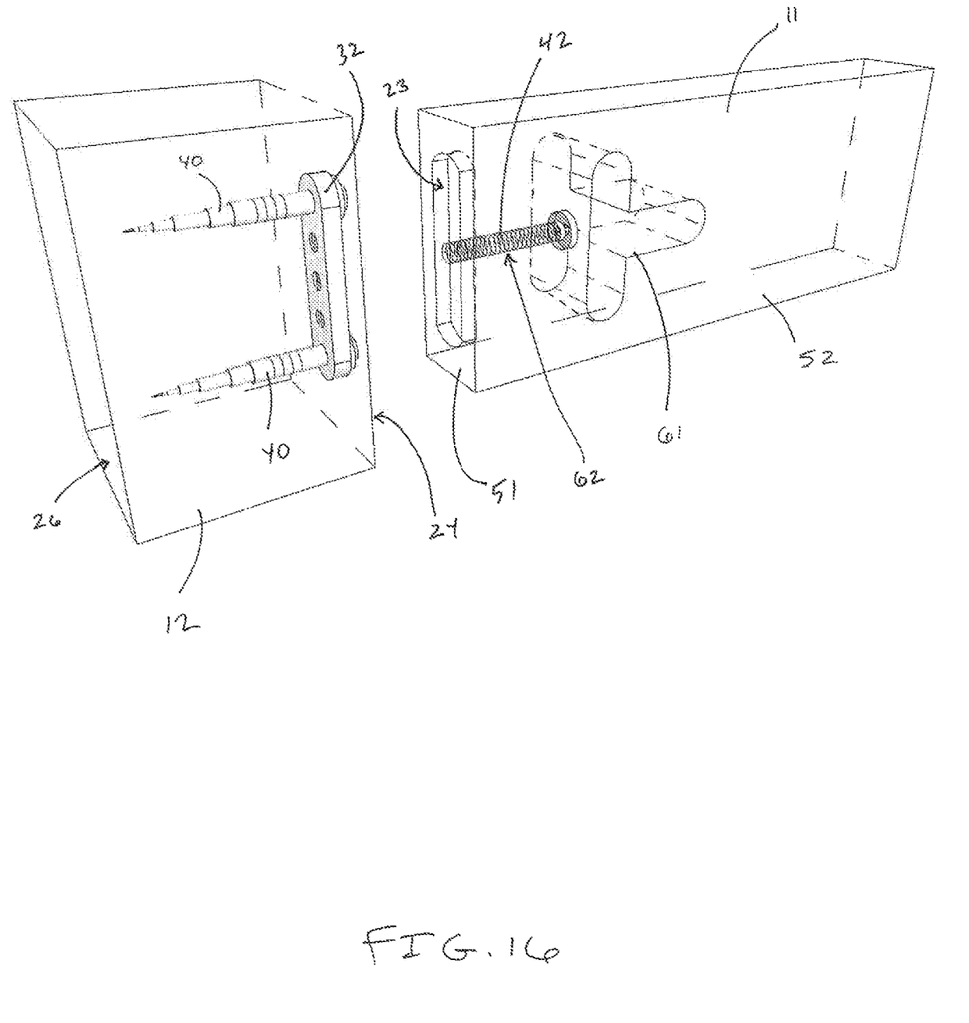
FIG. 16 is a perspective view of another example system of the present disclosure for connecting the first member to the second member. The first and second members are depicted disconnected from each other and transparent.

FIG. 16 depicts another example of system 30 connecting members 11, 12. In this application of the system 30, the tenon 32 is permanently attached to the first surface 24 of the second member 12 with the first and second fasteners 40 such that the tenon 32 extends from the second member 12 toward the first member 11. The cavity 23 is created on the first surface 51 of the first member 11 and the cavity 23 is shaped to receive the tenon 32. A first bore 61 is created on second surface 52 of the first member 11, and a second bore 62 extends from the cavity 23 to the first bore 62. A third fastener 42 is inserted through the first bore 61 and through the second bore 62 such that a portion of the third fastener 42 extends into the cavity 23. The first member 11 is then brought towards the first surface 24 of the second member 12 until the threaded end of the third fastener 42 engages a threaded hole 36 of the tenon 32. The third fastener 42 is turned inside the threaded hole 36 until the members 11, 12 are securely fastened to each other. To disconnect the member 11, 12 the third fastener 42 is turned in an opposite direction until the threads of the third fastener 42 disengage from the threaded hole 36. The process of attaching the first member 11 and the second member 12 and then disconnecting the members 11, 12 can be repeated unlimited times without damage to the members, fasteners, or tenon.

Figure 17:
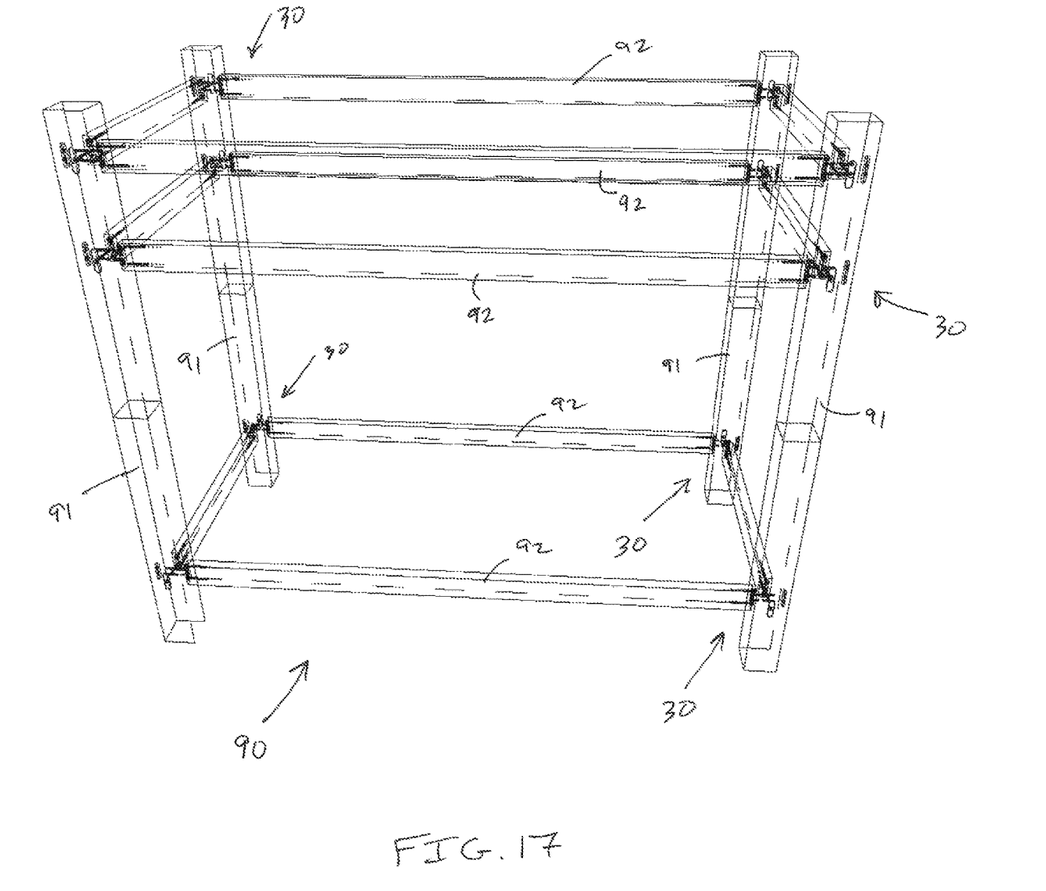
FIG. 17 is a perspective view of a bunk-bed constructed with systems of the present disclosure. The members that are connected to form the bunk-bed are depicted as transparent.

FIG. 17 depicts a bunk-bed 90 constructed with wooden members connected with multiple systems 30 of the present disclosure. The bunk-bed 90 has mattress supports 91 and safety rails 92 connected to vertical support posts 93 with multiple systems 30.

FIG. 18 depicts a table 100 with horizontal supports 101 and vertical supports 102, a rail 103, and a table top 104 connected with multiple systems 30. The table 100 illustrates that large, heavy, and/or bulky objects can be built in small components. The object can further be completely assembled for test fitting and then disassembled providing opportunities to clean, paint, stain, varnish the objects and then transport the large table as a disassembled group of components.

Figure 19:
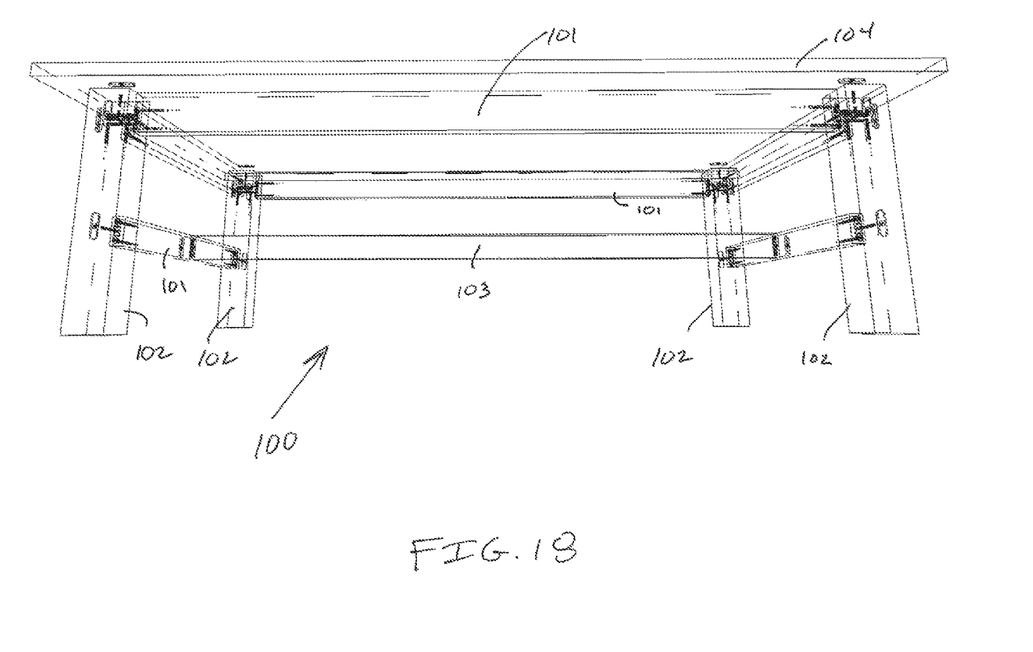
FIG. 19 is a perspective view of a structure constructed with systems of the present disclosure. The members that are connected to form the structure are depicted as transparent.

FIG. 19 depicts a timber-frame/post-and-beam structure 110. At each intersection of one member to another, regardless of angle to the member it meets, including perpendicular, parallel, greater than 90.0 degrees or less than 90.0 degrees as depicted for the roof framing a system 30 of the present disclosure can be used to connect the wooden members to each other. This example also depicts more than one system 30 used at corners of the structure 110 at which more than two wooden members intersect (e.g., four wooden members intersect at a roof corner). Accordingly, more than one system 30 can be used at these location and the fasteners are offset or staggered into different holes of the tenons such that the connection of the four member can be made.

In certain examples, the system 30 of the present disclosure uses a metal or synthetic tenon that is configured to create a better way to join two objects in a manner that allows the objects to be connected, disconnected, and then reconnected an unlimited number of times. Instead of cutting a long tenon on the butt end of a framing member and boring a deep, rectangular shaped mortise in the object it is to be attached to, as in traditional carpentry, the system 30 provides a thin intermediate tenon positioned between two members with a plurality of fasteners. Because the tenons can be manufactured from stainless steel, synthetics or other non-corroding materials the members may be kiln-dried wood, non-kiln-dried wood, green-treated wood, metal, synthetics, or concrete and furthermore the members can be components of structures that remain in even extremely wet conditions or even submerged without loss of structural integrity and without loss of the repeated assembly and disassembly benefits discussed previously. While traditional wood, dowels and biscuit tenons require a large surface area for glue, and therefore a deep mortise, to accept that tenon the system 30 does not require glue and therefore only requires the user to create a shallow mortise. The system 30 only requires a plurality of threaded metal or synthetic fasteners to create a connection, so the objects do not bend, twist, or pull out as they would with a traditional, non-glued, mortise and tenon joint. This lack of glue, using the system 30, allows users to assemble and disassemble the joined objects an unlimited number of times, which greatly expands the possible application. For example, the user may quickly assemble and then disassemble members to apply paints, stains and other finishes, to test fit objects or to reduce bulk for transporting and storage of large components created from multiple members such as large tables that need to be disassembled to be moved through small door openings and then reassembled, frequently moved items such as bunk beds or pre-built structures that need to be reduced in volume for transportation, or temporary seasonal structures that need to be assembled, disassembled, transported, stored, and then transported and reassembled as is the case with mobile ice-fishing, hunting, emergency, camping, construction shelters.

Note that while the above description of the fasteners, systems, and methods of the present disclosure refers to connecting wooden members, the fasteners, systems, and methods of the present disclosure may also be used to connect members formed of any material, such as plastic, composites, or metal.

In certain examples, a method for fastening a first wooden member to a second wooden member includes the step of securing, with a first fastener and a second fastener, a tenon to the first wooden member such that the tenon extends away from the first wooden member. The tenon has a first hole in which the first fastener is received, a second hole in which a second fastener is received, and a third hole. The method further includes the steps of positioning the tenon into a cavity defined in a first side of the second wooden member such that the first wooden member is adjacent to the first side of the second wooden member, positioning a third fastener through the second wooden member such that the third fastener extends into the cavity, and receiving the third fastener in the third hole of the tenon to thereby fasten the first wooden member to the second wooden member.

In certain examples, the method includes the steps of rotating the third fastener in the third hole of the tenon to thereby tighten the first wooden member to the second wooden member. In certain examples, the second wooden member extends along a longitudinal axis and has a second side opposite the first side and the third fastener extends transverse to the longitudinal axis between the first side and the second side of the second wooden member. In certain examples, the first fastener and the second fastener are self-tapping screws. In certain examples, a cutout is defined in the second side of the second wooden member and the third fastener has a head, and when the third fastener secures the first wooden member to the second wooden member, the head of the third fastener is recessed in the cutout. In certain examples, the method includes the step of removing the third fastener such that the first wooden member and the second wooden member can be disconnected from each other such that the tenon remains secured on the first wooden member such that first and second wooden member can be repeatably connected and disconnected without damaging the first wooden member, the second wooden member, the tenon, the fasteners, or the cavity.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for fastening a first wooden member to a second wooden member, the method comprising the steps of:
   securing, with a first fastener and a second fastener, a tenon to the first wooden member such that the tenon extends away from the first wooden member, wherein the tenon has a first hole in which the first fastener is received, a second hole in which the second fastener is received, and a third hole;
   positioning the tenon into a cavity defined in a first side of the second wooden member such that the first wooden member is adjacent to the first side of the second wooden member;
   positioning a third fastener through the second wooden member such that the third fastener extends into the cavity; and
   receiving the third fastener in the third hole of the tenon to thereby fasten the first wooden member to the second wooden member.

2. The method according to claim 1, further comprising the step of rotating the third fastener in the third hole of the tenon to thereby tighten the first wooden member to the second wooden member.

3. The method according to claim 1, wherein the second wooden member extends along a longitudinal axis and has a second side opposite the first side, and wherein the third fastener extends transverse to the longitudinal axis between the first side and the second side of the second wooden member.

4. The method according to claim 3, wherein the first fastener and the second fastener are self-tapping screws.

5. The method according to claim 3, wherein a cutout is defined in the second side of the second wooden member and the third fastener has a head, and wherein when the third fastener secures the first wooden member to the second wooden member, the head of the third fastener is recessed in the cutout or in direct contact with the second side of the second wooden member, and wherein an intermediary member can be placed between the head of the third fastener and the second side of the second wooden member.

6. The method according to claim 5, further comprising the step of removing the third fastener such that the first wooden member and the second wooden member can be disconnected from each other, and wherein the tenon remains secured on the first wooden member such that the first and second wooden members can be repeatably connected and disconnected without damaging the first wooden member, the second wooden member, the tenon, the fasteners, or the cavity.

7. A system for fastening a first wooden member to a second wooden member, the second wooden member extending along a longitudinal axis and having a first side and a second side opposite the first side, the system comprising:
   a tenon configured to couple to the first wooden member such that the tenon extends from the first wooden member, the tenon having a first hole, a second hole, and a third hole;
   a first fastener extending through the first hole of the tenon and configured to secure the tenon to the first wooden member;
   a second fastener extending through the second hole of the tenon and configured to secure the tenon to the first wooden member; and
   a third fastener extending through the second wooden member and received into the third hole of the tenon to thereby secure the first wooden member to the second wooden member.

8. The system according to claim 7, wherein the first fastener and the second fastener are configured to extend into the first wooden member.

9. The system according to claim 8, wherein the first fastener and the second fastener extend parallel to each other.

10. The system according to claim 9, wherein the first fastener and the second fastener are self-tapping screws.

11. The system according to claim 8 wherein the third fastener is configured to extend transverse to the longitudinal axis.

12. The system according to claim 11, wherein the third fastener is configured to extend perpendicular to the longitudinal axis.

13. The system according to claim 12, wherein the tenon has threads that extend into the third hole, and wherein the third fastener has threads that engage with the threads in the third hole to thereby couple the third fastener to the tenon.

14. The system according to claim 13, wherein engagement of the threads of the third fastener with the threads in the third hole causes the first wooden member to be drawn tightly towards and securely coupled to the second wooden member.

15. The system according to claim 8, wherein the third fastener is further configured to be disconnected from the tenon such that the first wooden member and the second wooden member disconnect from each other without damaging each other.

16. The system according to claim 7, wherein the first wooden member and the second wooden member are permanently secured to each other without adhesives or other fasteners.

17. The system according to claim 7, wherein the first wooden member and the second wooden member are secured together by the tenon, the first fastener, the second fastener, and the third fastener.

* * * * *